Figure 1:
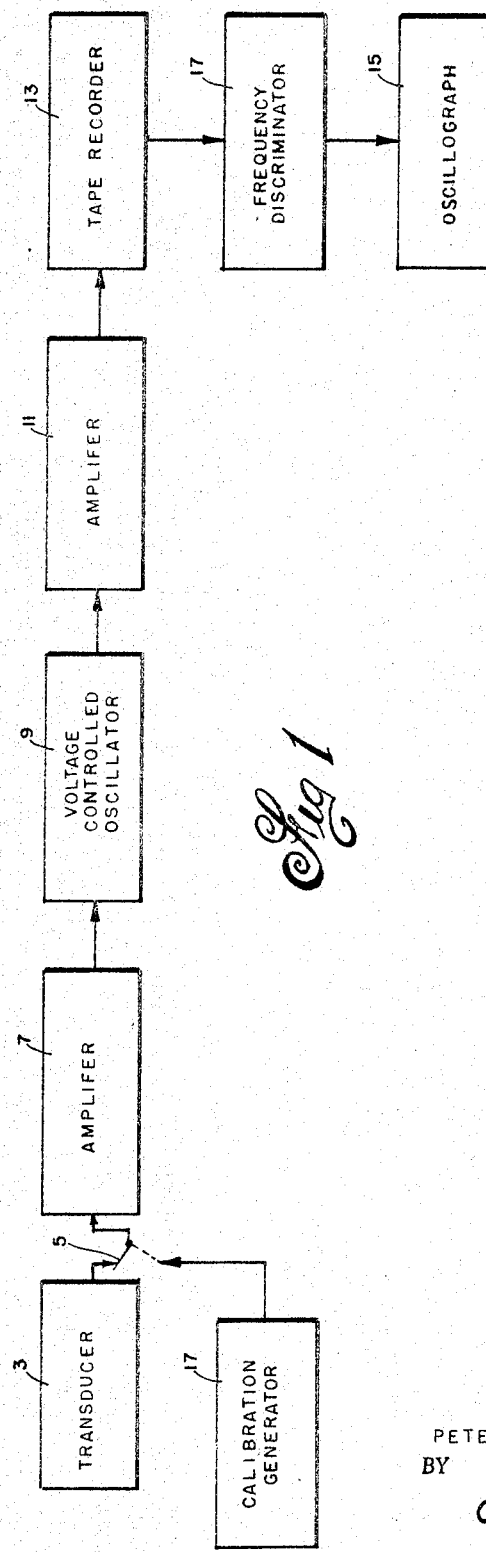

INVENTOR.
PETER WESTERVELT

United States Patent Office 3,276,683
Patented Oct. 4, 1966

3,276,683
CALIBRATION DEVICE
Peter Westervelt, 966 Westminster Drive, Toms River, N.J.
Filed Sept. 28, 1965, Ser. No. 491,057
5 Claims. (Cl. 235—61)

The present invention relates to a novel and improved device for checking the accuracy and reliability of apparatus which is used to record data on oscillograms. More particularly, it relates to a novel and improved device which facilitates the evaluation of calibration data on an oscillogram and readily indicates whether said calibration data recorded on the oscillogram is accurate within predetermined proscribed error limitations.

In collecting various types of experimental data, a parameter of interest is often monitored by a device which transforms the variations of the parameter into a proportionately varying electrical signal. This signal is then generally amplified, shaped and processed in various ways before it is finally recorded in a more permanent form on tape or on an oscillogram. As the temperature of the surrounding environment, the voltage supply source for the signal processing equipment and other conditions vary, however, errors are often introduced which substantially effect the accuracy of the parameter reading on the tape or oscillogram. In order to minimize the magnitude of these errors and maintain them within predetermined proscribed limits, it is necessary to periodically check the accuracy and linearity of the electronic processing equipment.

In the past, these periodic checks have been performed by energizing the electronic processing equipment with three calibration signals of predetermined amplitude. Thus, a signal of zero amplitude, a signal 50% of the expected maximum input signal, and a signal 80% of the expected maximum input signal are coupled to the electronic processing equipment. The reading on the oscillogram for the zero input signal is then subtracted from the 50% and 80% signal readings and the resulting adjusted 80% reading is divided by the adjusted 50% reading. When the proscribed maximum error is 2% and the quotient of the said operation of division is ±2% of 1.6, the equipment is performing its data processing operation within proscribed limits of accuracy and linearity. Such a method of periodically checking the operation of the electronic processing equipment, however, has been found to be time consuming and not sufficiently dependable in that the required mathematical computation though relatively simple is dependent upon the consistent accuracy of the calibration technician.

It is therefore a principal object of the present invention to provide a novel and improved device which is useful in the calibration of electronic data processing equipment.

It is a further object of the invention to provide a novel and improved device which can readily be used to evaluate calibration data for electronic data processing equipment.

Figure 2:
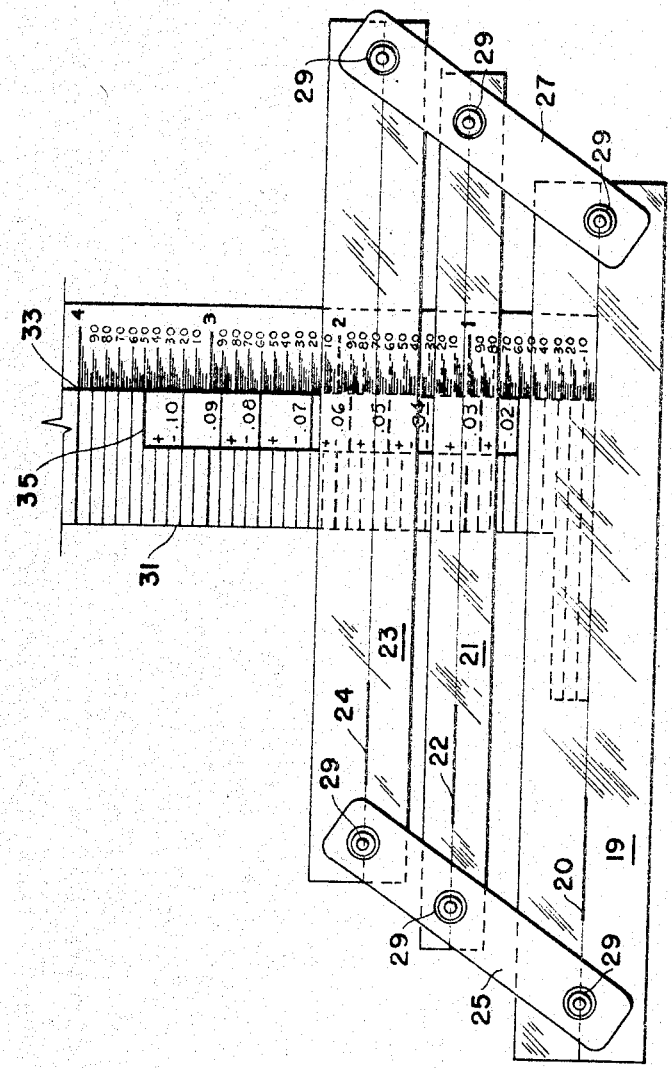

Other objects and many of the attendant advantages of this invention will be readily appreciated as the same becomes better understood by reference to the following detailed description when considered in connection with the accompanying drawing wherein:

FIG. 1 is a diagrammatic view of conventional equipment which is often used to electronically amplify, process and record data on an oscillogram and which is to be periodically checked for accuracy and linearity in accordance with the present invention; and FIG. 2 is elevational view of a preferred embodiment of the present invention.

Referring now to FIG. 1 of the drawing, it will be noted that electrical signals proportional to variations of the parameter to be monitored are normally fed from the transducer 3 through switch 5 and the differential amplifier 7 to the voltage controlled oscillator 9. The voltage controlled oscillator 9 converts variations in the amplitude of its input electrical signal into a variable frequency signal which is amplified by amplifier 11 and stored on the tape recorder or the like 13. A suitable oscillogram of the variations in the monitored parameter is obtained by coupling the output of the tape recorder 13 to the oscillograph 15 through the frequency discriminator circuit 17. When calibration of the electronic processing equipment, which includes the differential amplifier 7, the voltage controlled oscillator 9, the tape recorder 13, the frequency discriminator 17 and the oscillograph 15, is to be performed, switch 5 is operated so as to couple the calibrating signal generator source 17 to the input circuit of the differential amplifier 7. When this is done, calibration readings are recorded on the tape recorder 13 and the oscillograph 15 and are analyzed with the device which specifically embodies the subject matter of the present invention and which will now be described in detail.

As shown in FIG. 2 of the drawing, the improved device of the invention includes three elongated clear transparent strips 19, 21 and 23. A suitable hair line or the like preferably extends along the longitudinal axis of each of the strips. The three strips 19, 21 and 23 are pivotally coupled to one another by the linking members or arms 25 and 27 preferably by suitable bushings, rivets and washers at points 29. Arms 25 and 27 maintain the strips parallel to one another at all times and are also so attached to strips 19, 21 and 23 that the ratio of the distance between the hair lines of strips 19 and 21 and the distance between the hair lines of strips 21 and 23 is 8 to 5 at all times. Handles of suitable design may be attached to arms 25 and 27 to facilitate relative adjustment of the actual distances between the three strips. The top and bottom strips 19 and 23 are preferably of increased width so as to strengthen the construction of the device.

The clear transparent member 31 is secured to strip 19 in any suitable manner and extends upwardly and vertically therefrom preferably under strips 21 and 23 but is not attached thereto. Transparent member 31 is graduated into two separate predetermined scales 33 and 35. The scale 33 is subdivided into equal .02 inch increments beginning at the hair line of strip 19 and extending upwardly and vertically therefrom. The scale 35 is graduated so as to indicate a predetermined maximum allowed variance between the calibration or other signal on the oscillogram and the hair line on transparent strip 23. Thus, if the proscribed maximum error is ±2%, intersection of the hair line of the strip 21 which is superimposed on the 50% calibration reading 22 on the oscillogram with scale 35 provides a direct reading of the maximum permitted degree of non-coincidence of the 80% calibration reading 24 and the hair line of strip 23. Graduations of scale 35 are therefore located at 5⁄8 of the reading on scale 33 and are indexed by multiplying the reading on scale 33 by .02.

In operation, the hair line of strip 19 of the detector is first placed directly over the 0% calibration reading 20 on the oscillogram. The detector is then adjusted such that the hair line of strip 21 is positioned directly over the 50% calibration reading 22 on the oscillogram. The intersection of scale 35 with the hair line of strip 21 indicates the maximum allowed tolerance or error. The degree of non-coincidence of the hair line of strip 23 and the 80% calibration reading 24 on oscillogram is then noted. If this variation or degree of non-coincidence exceeds the error tolerance obtained on scale 35, the data processing equipment must be suitably adjusted. Scale 33 of the detector is conveniently used to read deflections or variations of the parameter which is being monitored.

It is to be understood that although signals 50% and 80% of the maximum expected input signal are often preferably used in the calibration of equipment of the kind described hereinabove, calibration signals of any other suitable magnitude may be used with a suitable change in the ratio of the distance between strips 19, 21 and 23 if necessary without departing from the spirit or scope of the present invention. Similarly, scale 35 could be computed using an error tolerance other than ±2% without departing from the spirit or scope of the present invention.

Obviously, many modifications and variations of the present invention are possible in the light of the above teachings. It is therefore to be understood that within the scope of the appended claims, the invention may be practiced otherwise than as specifically described.

What is claimed is:

1. An apparatus for determining the linearity of equipment employed to record data on oscillograms wherein three calibration signals of predetermined magnitude are preliminarily recorded on said oscillogram, a device comprising:
   (a) three elongated transparent strips;
   (b) means for adjustably controlling the relative disposition of said three strips such that they are parallel to one another at all times and the ratio of the distances between said strips is equal to the ratio of the magnitude of the three calibration signals;
   (c) and a transparent member which is secured to one of the said three strips extends vertically therefrom beyond the other strips, said transparent member being graduated in two separate predetermined scales, one said scale being subdivided into predetermined equal increments, the other said scale being graduated such that when one of the three strips and its adjacent intermediate strip are superimposed on two of the calibration signals on the oscillogram, intersection of the said intermediate strip with the said other scale indicates a predetermined maximum degree of non-coincidence of the third strip with the other calibration signal on the oscillogram.

2. The device described in claim 1 wherein the ratio of the distance between the said three transparent strips is eight to five.

3. An apparatus for determining the linearity of equipment employed to record data on oscillograms wherein three calibration signals of predetermined magnitude are preliminarily recorded on said oscillogram, a device comprising:
   (a) three elongated transparent strips;
   (b) a pair of arms pivotably interconnecting the three transparent strips such that the strips are parallel to one another at all times and the ratio of the distances between the strips is equal to the ratio of the magnitude of the three calibration signals,
   (c) and a transparent member which is secured to one of the said three strips extends vertically therefrom beyond the other strips, said transparent member being graduated in two separate predetermined scales, one said scale being subdivided into predetermined equal increments, the other said scale being graduated such that when one of the three strips and its adjacent intermediate strip are superimposed on two of the calibration signals on the oscillogram, intersection of the said intermediate strip with the said other scale indicates a predetermined maximum degree of non-coincidence of the third strip with the other calibration signal on the oscillogram.

4. An apparatus for determining the linearity of equipment employed to record data on oscillograms wherein three calibration signals of predetermined magnitude are preliminarily recorded on said oscillogram, a device comprising:
   (a) three elongated transparent strips, each said strip having a longitudinally oriented hair line,
   (b) means for adjustably controlling the relative disposition of said three strips such that they are parallel to one another at all times and the ratio of the distances between said strips is equal to the ratio of the magnitude of the three calibration signals;
   (c) a transparent member which is secured to one of the said three transparent strips and extends vertically therefrom beyond the other transparent strips, said transparent member being graduated in two separate predetermined scales, one said scale being subdivided into predetermined equal increments, the other said scale being graduated such that when the hair line of one of the three strips and the hair line of the adjacent intermediate strip are superimposed on two of the calibration signals on the oscillogram, intersection of the hair line of the said intermediate strip with the said other scale indicates a predetermined maximum degree of non-coincidence of the hair line of the third strip with the other calibration signal on the oscillogram.

5. An apparatus for determining the linearity of equipment employed to record data on oscillograms wherein three calibration signals of predetermined magnitude are preliminarily recorded on said oscillogram, a device comprising:
   (a) three elongated transparent strips, each said strip having a longitudinally oriented hair line,
   (b) a pair of arms pivotally interconnecting the three transparent strips such that the strips are parallel to one another at all times and the ratio of the distances between the strips is equal to the ratio of the magnitude of the three calibration signals;
   (c) a transparent member which is secured to one of the said three transparent strips and extends vertically therefrom beyond the other transparent strips, said transparent member being graduated in two separate predetermined scales, one said scale being subdivided into predetermined equal increments, the other said scale being graduated such that when the hair line of one of the three strips and the hair line of the adjacent intermediate strip are superimposed on two of the calibration signals on the oscillogram, intersection of the hair line of the said intermediate strip with the said other scale indicates a predetermined maximum degree of non-coincidence of the hair line of the third strip with the other calibration signal on the oscillogram.

References Cited by the Examiner

UNITED STATES PATENTS 650,683  5/1900  Kauser _____ 33—108

RICHARD B. WILKINSON, *Primary Examiner.*